United States Patent [19]

Matthews et al.

[11] Patent Number: 4,565,964
[45] Date of Patent: Jan. 21, 1986

[54] CABLE INTEGRITY BY ACOUSTIC EMISSION

[75] Inventors: James R. Matthews, Lower Sackville; George K. Schattschneider; Mervin R. Black, both of Victoria; James A. Perkins, Sooke, all of Canada

[73] Assignee: Her Majesty the Queen in right of Canada, as represented by the Minister of National Defence of Her Majesty's Canadian Government, Ottawa, Canada

[21] Appl. No.: 540,476

[22] Filed: Oct. 11, 1983

[30] Foreign Application Priority Data

Oct. 15, 1982 [CA] Canada .................................. 413580

[51] Int. Cl.[4] ............................................. G01R 31/02
[52] U.S. Cl. ....................................... 324/51; 340/587
[58] Field of Search ................ 324/51, 52, 54; 73/587

[56] References Cited

U.S. PATENT DOCUMENTS 3,713,127 1/1973 Keledy et al. ......................... 73/587
4,481,818 11/1984 Hellqvist .............................. 73/587

Primary Examiner—Stanley T. Krawczewicz
Assistant Examiner—Jack B. Harvey
Attorney, Agent, or Firm—Anthony T. Lane; Jeremiah G. Murray; Edward Goldberg

[57] ABSTRACT

A system for monitoring the integrity of a cable, for example a cable for towing a variable depth sonar body through the ocean, is described. Such a cable comprises a core of electrical wires surrounded by load bearing wires which are secured to the sonar body through a terminator. For various reasons cracks can appear in the load bearing wires and in extreme cases one or more of the wires may break. The monitoring system includes a transducer located near the terminator where the wires are most likely to crack or break and acoustic emissions caused by the incidence of cracks or breaks are picked up by the transducer. The resulting electrical signals are amplified and passed up the electrical core of the cable to the towing vessel where they are processed. Novel aspects of the system are the water coupling between the location of the cracks or breaks and the transducer and special processing circuitry which enables breaks, cracks and electrical noise to be distinguished from each other.

8 Claims, 9 Drawing Figures

CABLE INTEGRITY BY ACOUSTIC EMISSION

BACKGROUND OF THE INVENTION

1. Field of the Invention

This invention relates to the monitoring of the integrity of a cable designed for supporting a load underwater.

The invention is particularly but not exclusively applicable to the monitoring of a cable which carries at its lower end a sonar body and which trails from the stern of a vessel for towing the sonar body at a predetermined depth beneath the surface of a body of water.

2. Description of the Prior Art

Among the problems encountered in such a system is the development of microcracks in or complete failure, i.e. breakage, of one or more of the load bearing wires making up the cable. This problem may be the result of overloading due to operator error, equipment malfunction, or adverse sea conditions or the like, or may be the result of metal fatigue. Almost invariably the development of microcracks or failure of a wire takes place at or near the point at which the cable is joined or terminated to the sonar body. It has previously been proposed to monitor the occurrence of cracks or breakages in a variable depth sonar system by monitoring the acoustic emissions which arise from the cable upon occurrence of a crack in or failure of a wire.

SUMMARY OF THE INVENTION

It is therefor a primary object of the present invention to provide a cable monitoring system which utilizes the acoustic emissions caused by cracks in or failure of a wire, and which, although highly sensitive, is sufficiently rugged to operate without damage to the individual components used.

According to a broad aspect of the present invention there is provided a system for monitoring the integrity of a potentially weak location of a cable made up of a plurality of wires designed for carrying a load under a body of water, the system comprising an acoustic emission transducer located proximate the potentially weak location to receive acoustic emissions coupled from the potentially weak location through the water on occurrence of microcracks or breaks in any of the wires, and means for processing and transmitting electrical signals from the transducer to obtain an indication at the surface of the body of water of the number of cracks or breaks at the location.

The water coupling has been found to be an extremely effective technique for conveying the acoustic emissions from their source to the transducer without the necessity for providing a wave guide which is difficult to attach. The transducer may be secured to the cable by any suitable technique such as clamping or taping so that it is spaced by a small gap from the expected location of the cracks or breaks and it is found that the transducer is not easily subjected to damage when secured in this way.

The invention will now be described in greater detail with reference to the accompanying drawings.

DESCRIPTION OF THE PREFERRED EMBODIMENT

Figure 1:
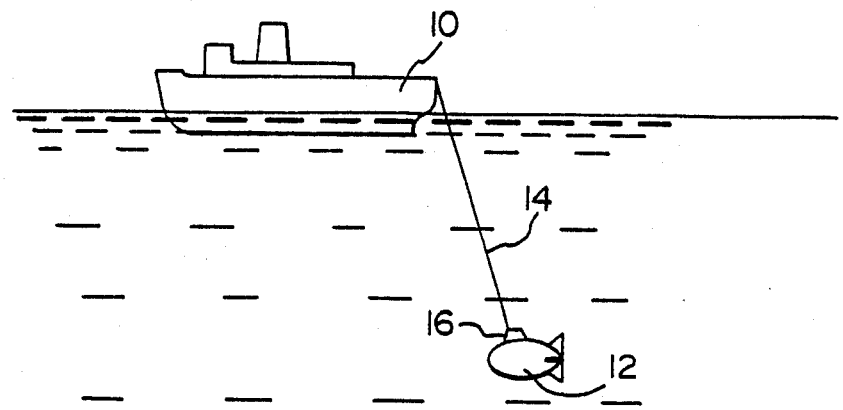
FIG. 1 is a schematic view of a vessel towing a sonar body by means of a cable.

FIG. 1 illustrates a ship 10 towing a sonar body 12 which is suspended from the ship by means of an armoured cable 14. The sonar body 12 is secured to the cable 14 by means of a terminator 16.

Figure 2:
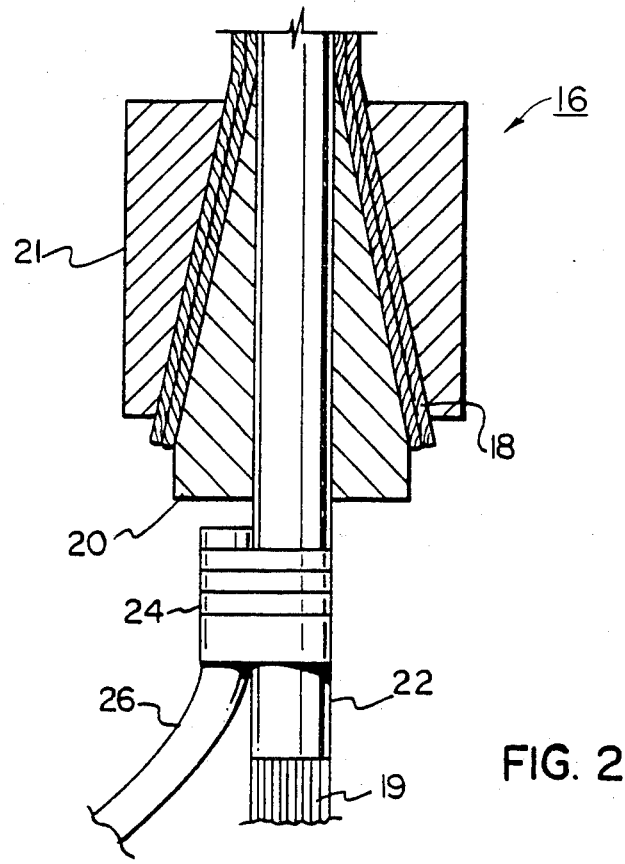
FIG. 2 is an enlarged schematic view showing a lower portion of the cable at the location where it is secured to the sonar body.

In FIG. 2, which illustrates the details of the cable terminator 16, the cable is shown having a plurality of steel wires 18 surrounding a central core 22 with the wires secured between the exterior surface of a cone 20 and the conical interior surface of a sleeve 21, the cone and sleeve forming terminator 16. The central core 22 of the cable 14 consists of a plurality of electrical wires 19 embedded in a resilient insulator which serve the purpose of transmitting electrical signals between the sonar body 12 and the ship 10. A differential output acoustic emission transducer 24 is attached proximate the cone and is surrounded by water which acoustically couples the transducer to the armoured cable 14 through the cone 20. The method of attachment of the transducer 24 is by means of tape wound around the body of the transducer and the central core 22 of the cable. The transducer 24 is connected by electrical wires 26 to a band pass amplifier 28 (see FIG. 3). Band pass amplifier 28 consists of a 60 dB preamplifier and 0.5–1 MHz filter both of which are commercially available but which have been encased in a waterproof container (not shown) mounted on the sonar body. Transducer 24 is a commercially available acoustic emission (AE) transducer but it must be ruggedized and waterproofed. After it is electrically connected by solder to the underwater cable that leads to the waterproof container and before it can be put into service, it is preferably encapsulated in epoxy, coated with several layers of liquid neoprene, and structurally supported over the epoxy-cable interface with liquid-center heat-shrink.

Figure 3:
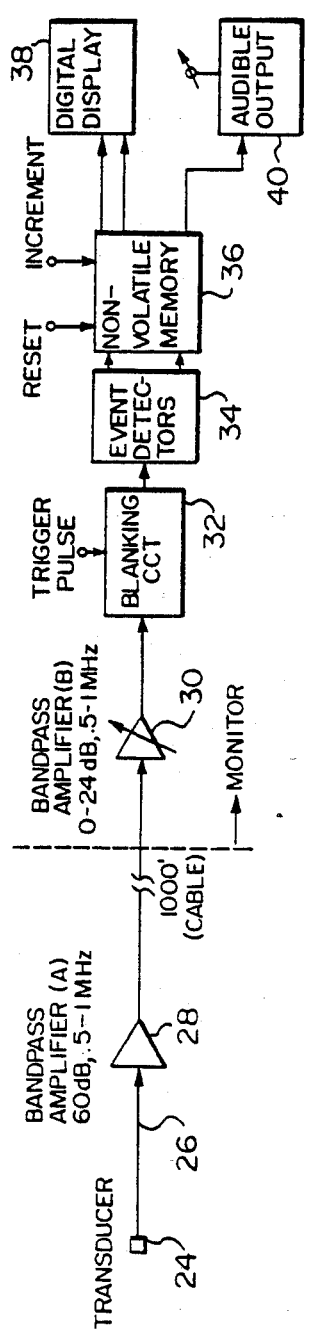
FIG. 3 is a block diagram showing the system for monitoring the cable integrity.

Referring now to FIG. 3, the output signal from the band pass amplifier 28 is connected through two spare conductors of cable core 22 to a second band pass amplifier 30 operating at 0–24 dB at a frequency of 0.5–1 MHz. This band pass amplifier 30 is the first of several components on board the ship which form part of the cable integrity monitor. Its purpose is to remove noise from the signal which noise entered the system after band pass amplifier 28. Band pass amplifier 30 is gain adjusted to compensate for amplitude loss in the cable.

The output of band pass amplifier 30 is connected to a blanking circuit 32 the purpose of which is to blank the signal during sonar pulses from the sonar body 12 so that these sonar pulses are not picked up and read as cable cracks or failures.

The output of blanking circuit 32 is connected to event detectors 34 which are able to discriminate between wire fractures, cracks or noise based on the amplitude and duration of the signals read by the event detectors.

The outputs from the event detectors 34 pass to a non-volatile memory 36 which keeps a record of fractures and cracks. Connected to outputs of memory 36 are a digital display 38 having a seven segment LED readout and an audible alarm 40 which alerts the operator to the incidence of fractures or cracks.

Figure 4:
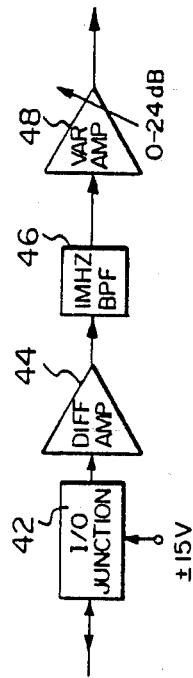
FIG. 4 is a block diagram of a band pass amplifier used in FIG. 3.

Turning now to FIG. 4, the second band pass amplifier 30 is shown in more detail. It comprises an input/output junction 42 which is a passive bidirectional interface, a differential amplifier 44 which buffers the acoustic emission signal and removes any common-mode noise that was picked up in the cable, a band pass filter 46 which removes any noise outside the band (0.5–1 MHz) of interest and a variable amplifier 48 which compensates for signal amplitude loss in the cable.

The purpose of input/output junction 42 is to permit d.c. voltages to pass from the shipboard equipment down the same two wires upon which the acoustic emission signals are travelling without interference. This permits a ±15 V d.c. signal to power the first band pass amplifier 28 from the shipboard equipment.

Figure 5:
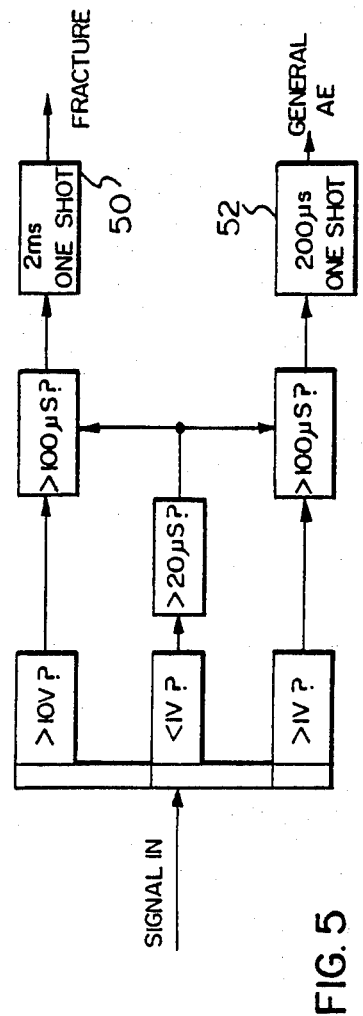
FIG. 5 is a block diagram showing the function of event detectors used in FIG. 3.

With reference now to FIG. 5, the event detectors 34 will be described in greater detail. The incoming acoustic emission signal is first tested to determine whether its amplitude is >10 V, <1 V or >1 V. If the amplitude is >10 V, the duration of the signal is examined to determine whether it is >100 usecs. If it is, then a 2 msec. one-shot 50 is energized to produce a signal indicating a fracture.

If the amplitude is >1 V (but <10 V), again the signal is tested for duration and, if it is >100 usecs., a 200 usec. one-shot 52 is fired to produce a signal indicating a crack.

If the signal is <1 V for a duration >20 usec., a reset signal which resets the >10 volt and >1 volt lines is generated. A short large noise burst having an amplitude >10 V but decaying quickly would be detected as noise because within the 100 us period the signal would drop below the 1 V and remain there for longer than 20 usec.

Figure 6:
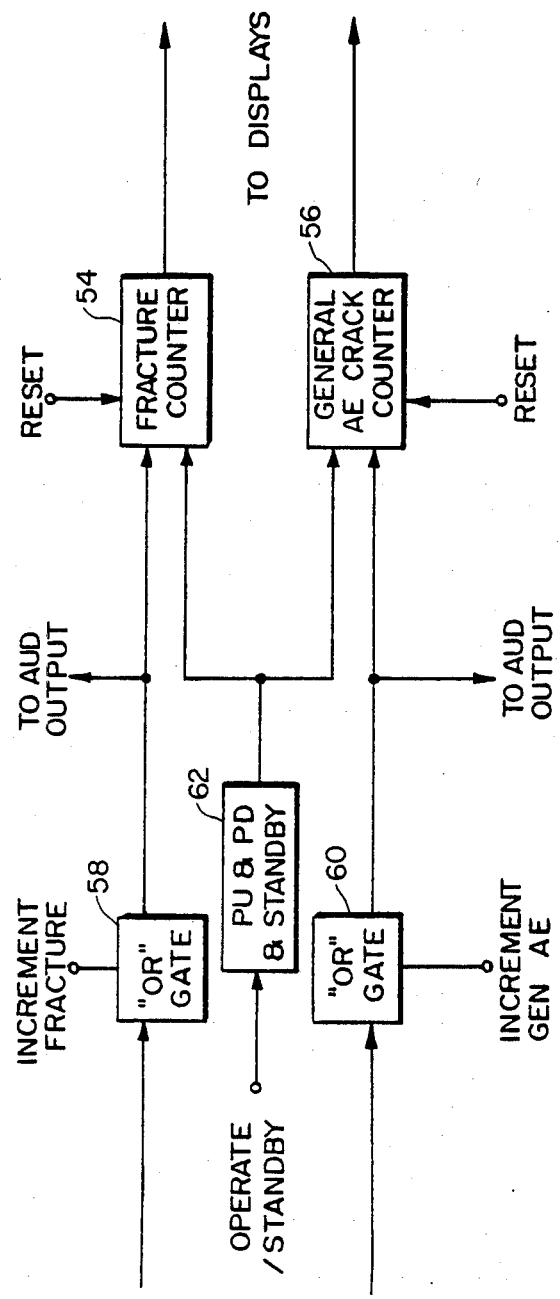
FIG. 6 is a block diagram of a non-volatile memory used in FIG. 3.

FIG. 6 shows the non-volatile memory 36. This comprises two counters, a fracture counter 54 and a crack counter 56. Each is incremented through a respective OR gate 58 or 60 by the appropriate "fracture" or "crack" signal emanating from one-shot 50 or one-shot 52.

The power up/power down unit 62 is connected to the two counters 54 and 56 to inhibit them during the power-up cycle and the power-down cycle during which times the system voltages are unstable. There is also a standby battery to ensure count retention during power failure.

Figure 7A:
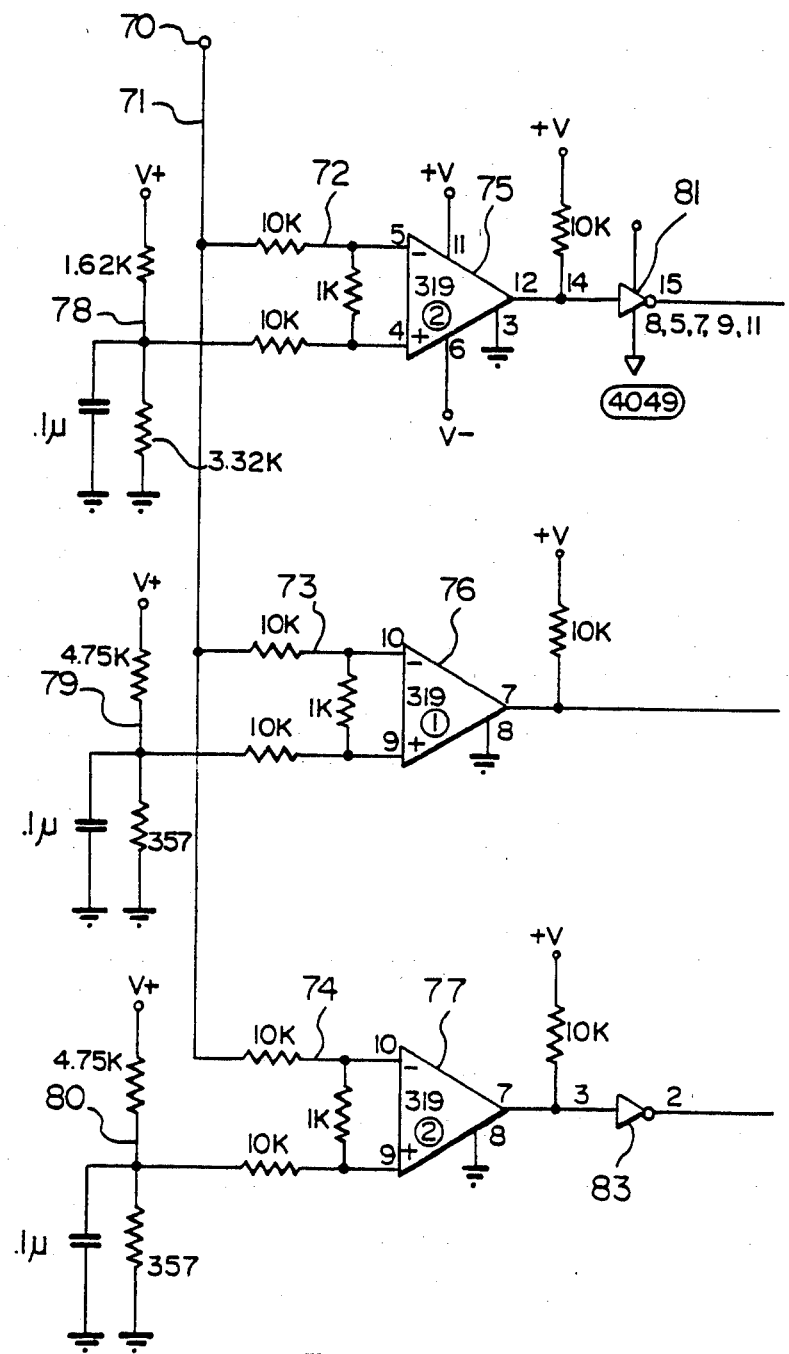
FIGS. 7a and b are schematic circuit diagrams showing in greater detail the circuitry of the event detectors.

The event detectors, the function of which is shown in FIG. 5, will now be described in greater detail with reference to FIG. 7a. Input terminal 70 is coupled via line 71 and 10K ohm resistors 72, 73 and 74, respectively, to the inverting inputs of three voltage comparators 75, 76 and 77. The noninverting input of comparator 75 is set at approximately 10 volts using voltage divider 78, the noninverting input of comparator 76 is set at approximately 1 volt using voltage divider 79, and the noninverting input of comparator 77 is also set at approximately 1 volt using voltage divider 80, the supply voltage V+ being 15 volts.

Figure 7B:
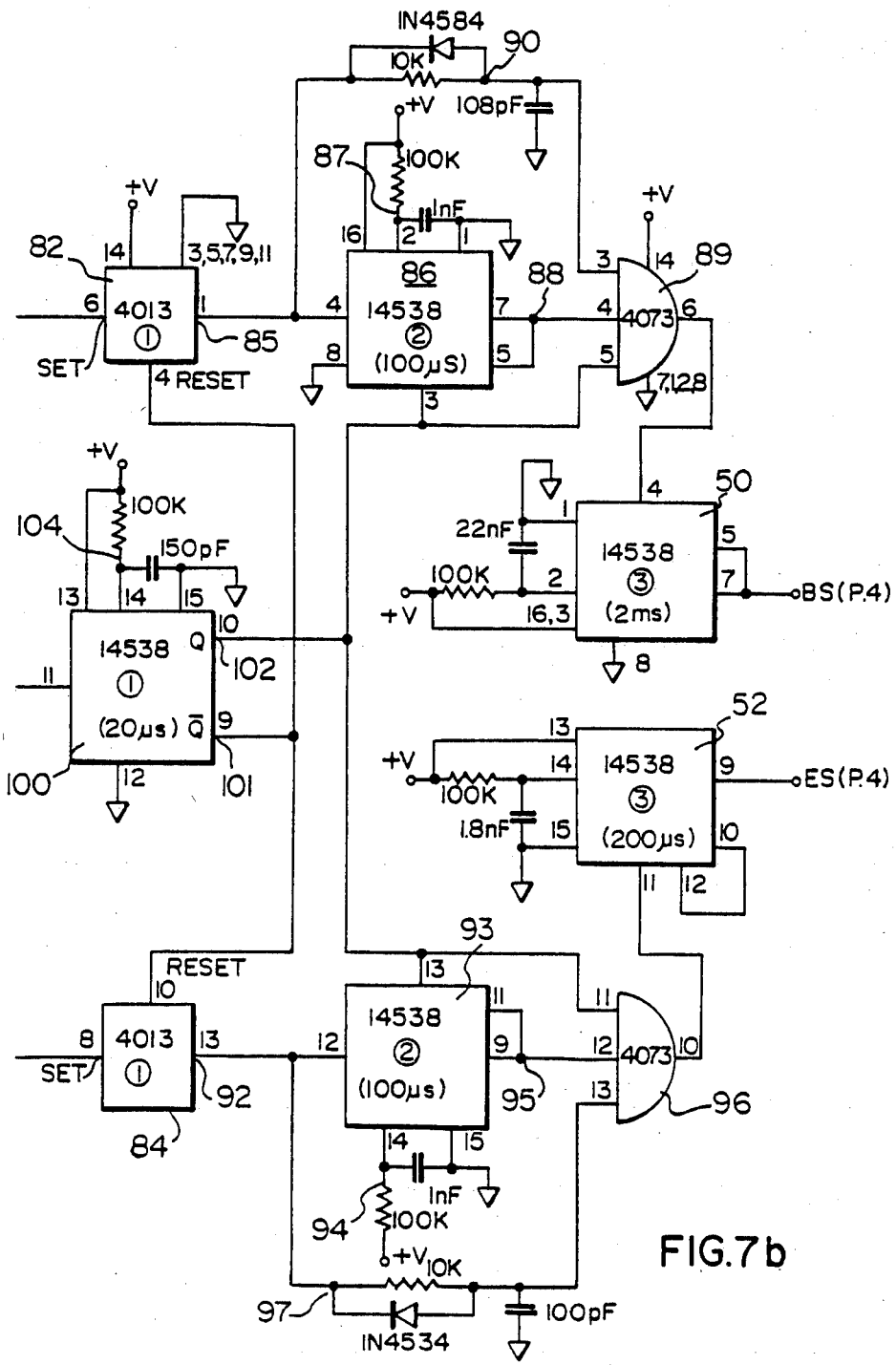

The output of voltage comparator 75 is connected to an inverter 81 in turn connected to the set input of a bistable multivibrator 82 shown in FIG. 7b. Similarly, the output of voltage comparator 77 is connected through an inverter to the set input of a bistable multivibrator 84. The output terminal 85 of multivibrator 82 is connected to the set input of a non-retriggerable monostable multivibrator 86 having a timing circuit 87 setting the duration of outpulses from output 88 at 100 usecs. Output 88 is connected to one input of an AND gate 89, the output of which is connected to a trigger input of 2 msec. non-retriggerable one-shot 50 (shown also in FIG. 5). A second input of AND gate 89 is connected to terminal 85 of multivibrator 82, bypassing multivibrator 86 and connected instead via a resistor, diode, capacitor branch 90 causing the rising edge of a pulse to be delayed without delaying the falling edge.

Similarly the output terminal 92 of bistable multivibrator 84 is connected through non-retriggerable monostable multivibrator 93 and circuitry 97, corresponding to multivibrator 86 and circuitry 90, to two inputs of an AND gate 96. Multivibrator 93 also has a timing circuit 94 setting the duration of the pulses at output 95 at 100 usecs. The output of AND gate 96 is connected to the trigger input of 200 usec. retriggerable one-shot 52 (shown also in FIG. 5).

The output of voltage comparator 76 is connected to the input of a retriggerable monostable multivibrator 100 of FIG. 7b having a Q output 101 and a Q̄ output 102. Output 101 is connected to the reset inputs of multivibrators 82 and 84 and output 102 is connected to the reset inputs of multivibrators 86 and 93 and also to a third input of AND gate 84 and a third input of AND gate 96. Multivibrator 100 has a timing circuit 104 which sets the duration of the output pulses at 20 usecs. from the last trigger pulse.

The operation of the circuitry of FIGS. 7a and 7b will now be described with reference also to FIG. 8 where the numbers down the left hand side indicate the components or outputs at which the respective aligned waveforms are derived.

In operation, if a signal burst, longer than 100 usec., having a magnitude greater than 10 volts is received at terminal 70, a negative pulse train appears at the output of comparator 75 and this is inverted by inverter 81 to a positive pulse train which is applied to the set input of multivibrator 82 causing a positive output at terminal 85. This causes a 100 usec. negative pulse to be supplied from multivibrator 86 to one of the inputs of AND gate 89 and a delayed positive signal level to be applied to another input of AND gate 89. Meanwhile, a negative pulse train is also generated at the output of comparator 76 and this causes retriggerable multivibrator 100 to provide a positive pulse on Q̄ output 102 and thence to the third input of AND gate 89. This third pulse lasts 20 usecs. longer than the final retrigger pulse from comparator 76. Thus, after the lapse of 100 usecs. a positive pulse appears at the output of AND gate 89 and one-shot 50 will be fired indicating a fracture. The positive pulse has a duration of the pulse from multivibrator 100. Incidentally one-shot 52 will also be fired because comparator 77 will also generate a negative pulse train. However, this results in no error because a fracture count is also part of the cumulative general AE (acoustic emission) count.

If a signal burst having a magnitude greater than 1 volt but less than 10 volts and lasting longer than 100 usecs. is received at terminal 70 then one-shot 52 alone will fire, signifying a microcrack.

Figure 8:
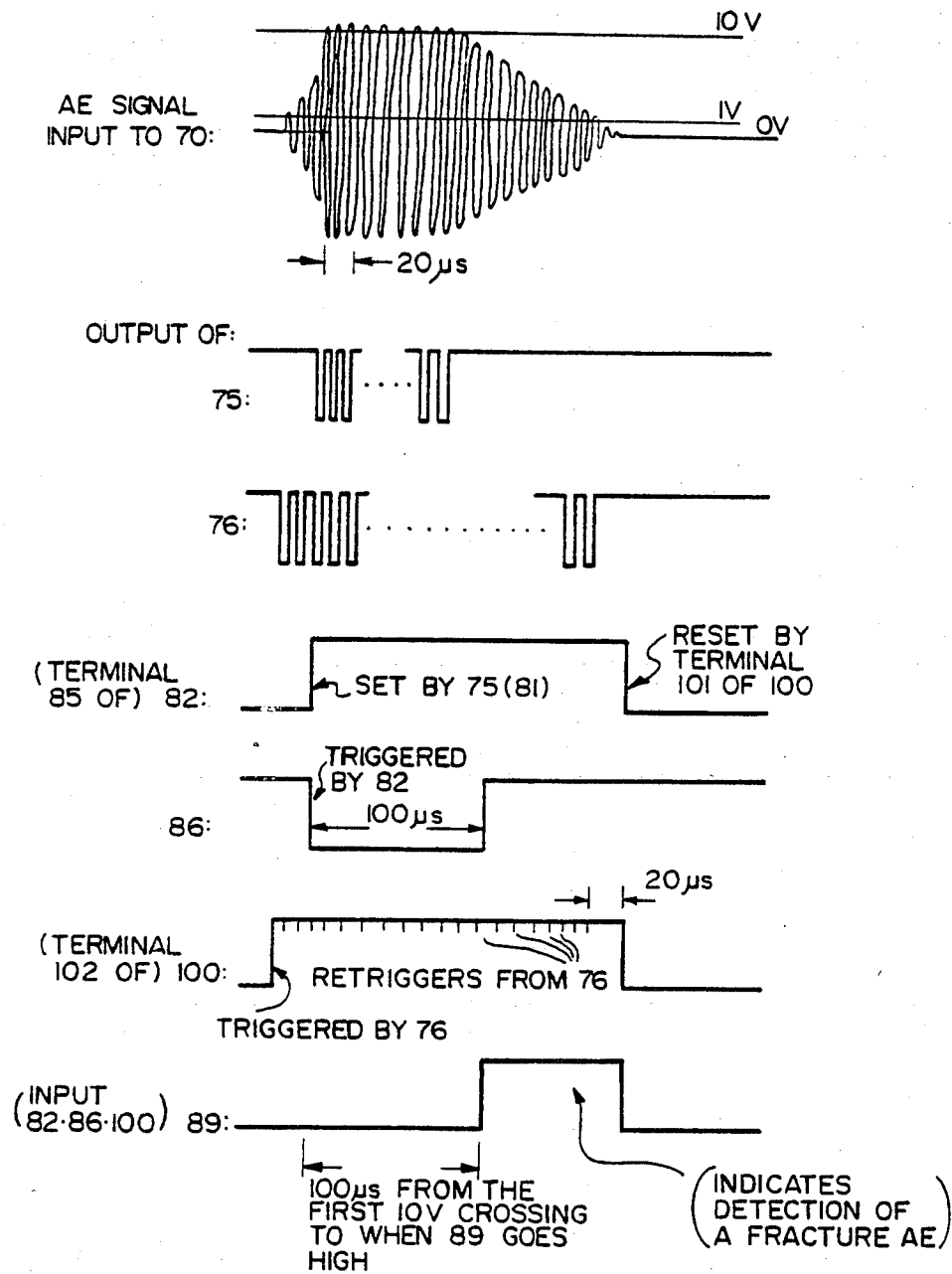
FIG. 8 is a timing diagram showing the signals present at various parts of the circuit of FIGS. 7a and b.

If a noise burst similar at its leading edge to the AE signal shown in FIG. 8 is received at terminal 70, it will not last for 100 usecs. but will rapidly decay to less than 1 volt for a period exceeding 20 usecs. In this case the positive pulse from terminal 102 of multivibrator 100 will not exceed the duration of the 100 usec. negative pulse from multivibrator 86 and so AND gate 89 will not produce a positive output. In this way electrical noise is ignored.

What is claimed is:

1. A system for monitoring the integrity of a potentially weak section of a towing cable having a plurality of electrical signal transmitting wires and a plurality of wires for carrying a load at one end under a body of water, the system comprising: an acoustic emission transducer secured on the cable at said one end proximate the potentially weak section of cable to receive acoustic emissions from said section coupled through the surrounding water on occurrence of microcracks or breaks in any of the load carrying wires and provide electrical signals representative of said emissions to said signal transmitting wires, and means for processing said signals from the transducer to obtain an indication at the other end of said cable of the number of cracks or breaks in the load carrying wires of said cable, said means for processing said signals from said transducer including means at the other end of said cable for monitoring the magnitude and duration of the electrical signals to discriminate between electrical noise and signals arising as a result of cracks or breaks and between signals arising from cracks and breaks.

2. The system according to claim 1 wherein said means for monitoring comprises a first comparator means for determining whether the electrical signals from the transducer exceed a first predetermined relatively high magnitude and first time means connected to the first comparator means for determining whether electrical signals which exceed the first magnitude also exceed a first predetermined duration, a second comparator means for determining whether the electrical signals from the transducer exceed a second predetermined relatively low magnitude and a second time means connected to the second comparator means for determining whether electrical signals which exceed the second magnitude also exceed a second predetermined duration which may be identical to the first duration, third comparator means for determining whether the electrical signals from the transducer are less than a third magnitude which may be identical to the second magnitude, and third time means connected to the third comparator means for determining whether electrical signals which are less than the third magnitude, exceed a third predetermined duration.

3. A system according to claim 2 in which the third time means is connected through logic circuitry to the first and second time means to disable the first and second time means upon the occurrence of electrical signals less than the third magnitude and exceeding the third predetermined duration.

4. A system for monitoring the integrity of a cable for towing a load through a body of water, the cable including a plurality of load bearing wires surrounding a plurality of insulated signal carrying electrical wires, the load bearing wires being connected at one end to the load through a mechanical terminator and the load bearing wires being connected at the other end to a towing vessel, said electrical wires carrying signals between said vessel and load, the system comprising: an acoustic emission transducer securred to the cable proximate the terminator to receive acoustic emissions and provide corresponding electrical signals on occurrence of microcracks or breaks in any of the load bearing wires, said acoustic emission being coupled to said transducer from the location of the microcrack or breaks through the body of water and said corresponding signals being connected to said electrical wires, and means for processing said signals from the transducer to obtain an indication on the vessel of the number of cracks or breaks in the load bearing wires, said means for processing the electrical signals from the transducer including means for monitoring the magnitude and duration of the electrical signals for discriminating between electrical noise and signals arising as a result of cracks or breaks at the location and between signals resulting from cracks and breaks, said means for monitoring including means for detecting three different signal amplitude levels and three different signal time durations, and means for combining said signal amplitude levels and time durations to discriminate between said cracks and breaks and noise signals.

5. A system according to claim 4 in which the means for monitoring includes a first comparator means for determining whether the electrical signals from the transducer exceed a first predetermined relatively high magnitude and first time means connected to the first comparator means for determining whether electrical signals which exceed the first magnitude also exceed a first predetermined duration, a second comparator means for determining whether the electrical signals from the transducer exceed a second predetermined relatively low magnitude and second time means connected to the second comparator means for determining whether electrical signals which exceed the second magnitude also exceed a second predetermined duration which may be identical to the first duration, third comparator means for determining whether the electrical signals from the transducer are less than a third magnitude which may be identical to the second magnitude, and third time means connected to the third comparator means for determining whether electrical signals which are less than the third magnitude exceed a third predetermined duration.

6. A system according to claim 5 including logic circuit means connecting the third time means to the first and second time means to disable the first and second time means upon the occurrence of electrical signals less than the third magnitude and exceeding the third predetermined duration.

7. A system according to claim 4 in which said means for processing includes a first band pass amplifier located near the transducer, processing circuitry located on the vessel, and a waterproof housing enclosing the band pass amplifier, said amplifier being electrically connected to the processing circuitry via the electrical wires of the cable.

8. A system according to claim 7 in which the processing circuitry includes, ad.c. signal source, a second band pass amplifier and an input/output junction, said junction permitting the first band pass amplifier to be energized by said d.c. signal via the electrical wires of the cable and permitting electrical signals from the transducer to travel along said wires without interference from the d.c. signal.

* * * * *